E. EDWARDS & J. COWEE, Jr.
MACHINE FOR CUTTING CHAIR BACKS.
No. 34,675.                    Patented Mar. 18, 1862.
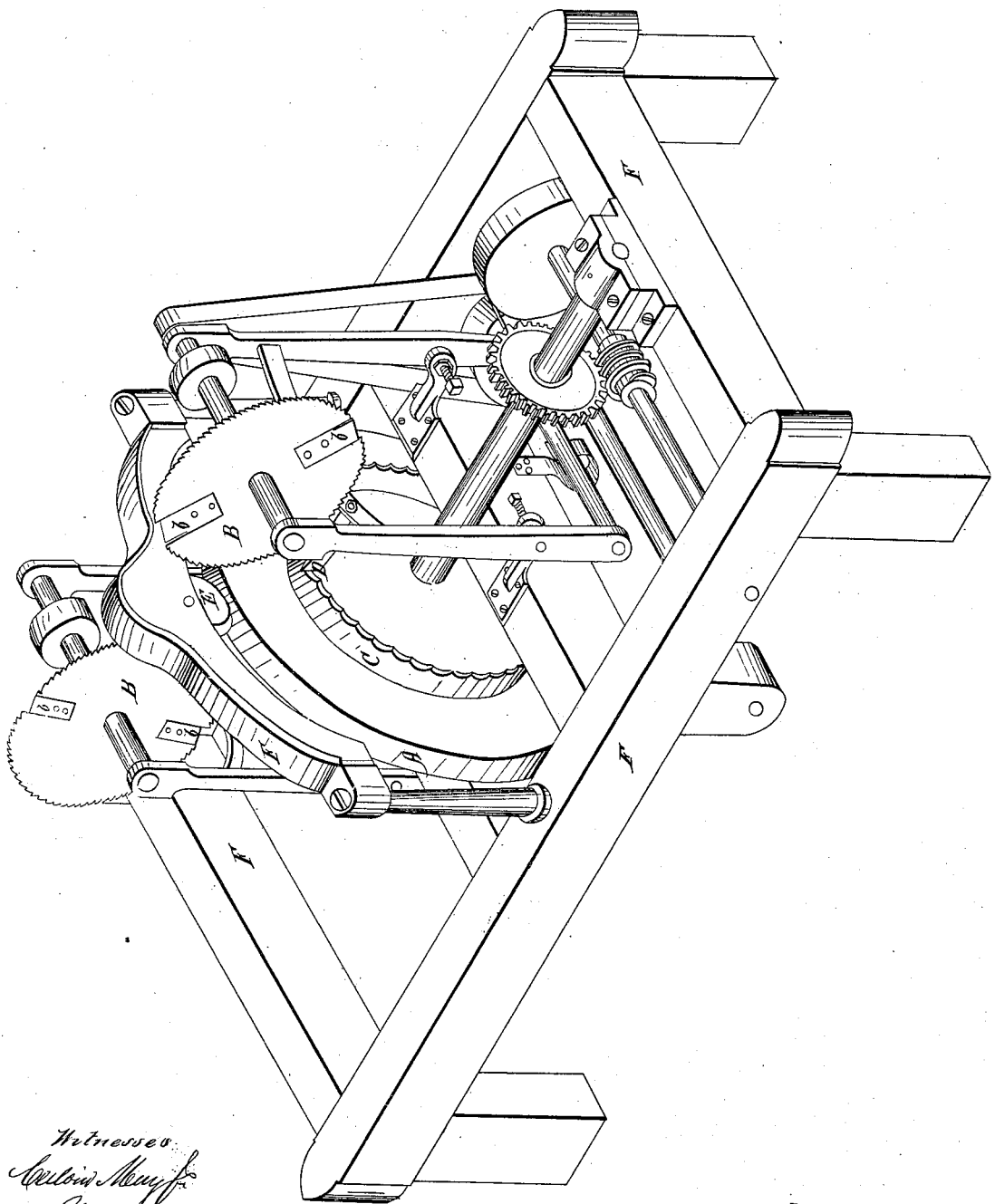

UNITED STATES PATENT OFFICE.

EDWARD EDWARDS AND JOEL COWEE, JR., OF KEENE, NEW HAMPSHIRE.

IMPROVEMENT IN MACHINES FOR CUTTING CHAIR-BACKS.

Specification forming part of Letters Patent No. 34,675, dated March 18, 1862.

*To all whom it may concern:*

Be it known that we, EDWARD EDWARDS and JOEL COWEE, Jr., of Keene, in the county of Cheshire and State of New Hampshire, have invented a new and useful Improved Machine for Cutting or Shaping Chair-Backs; and we do hereby declare that the following is a full and exact description thereof, reference being made to the accompanying drawing, which shows the machine in perspective.

This invention is designed for shaping the edges of the curved top or cross-pieces which are used in the construction of the backs of many kinds of chairs or other similar work, cutting them from boards of uniform width to a curved, serrated, serpentine, or any other desired form or style.

It consists of cylindrical revolving table A, the periphery of which forms a series of beds or seats for receiving the pieces to be cut and carrying them forward to the cutting-tools B B, which are arranged on each side of A, so as to shape both edges of the back at the same time. These cutting-tools are made similar to a circular saw with the addition of knives or blades $b\ b$, which project from the side of the saw-plate sufficiently to cut away the greater portion of the surplus material in advance of the saw; but as they do not extend so far outward (diametrically) a light shaving is left for the saw to cut. By this combination of the blades and saw the tool is capable of making a very deep cut when necessary, and of allowing the finer cutting-teeth of the saws to make a light finishing cut and leave the work as smooth and perfect as possible. These tools B B are mounted on oscillating frames and are operated to and from the work by a series of patterns C C attached to and carried by the table A, shaping the backs in conformity to any desired style of patterns which may be used.

D D are pins which project from the oscillating frames and work against the patterns C C.

E is a pressure-roller which rests on the backs and confines them to the table while passing the cutting-tools.

F is the frame, which supports the various parts of the mechanism.

The tools B B are made to revolve rapidly by bands around the pulleys on their respective arbors from any suitable motive power, while the revolving table A is driven at a greatly-reduced velocity by a worm-wheel and a series of bands and pulleys from a small pulley on one of the cutter-arbors.

The attendant in operating this machine has only to place the uncut pieces in their proper positions on the table A, and as it carries them forward by the tools B B they are reduced to a proper form and discharged on the opposite side.

About three thousand chair-backs can be shaped per day by this machine, which is more than double the number which can be done by the ordinary method of scroll or jigger sawing; besides, the quality of the work is much better.

What we claim as our invention, and desire to secure by Letters Patent, is—

The combination and arrangement of the oscillating cutting-tools B B, the revolving table A, and patterns C C, operating substantially as and for the purpose set forth.

EDWARD EDWARDS.
JOEL COWEE, JR.

Witnesses as to Edwards:
 CALVIN MAY, Jr.,
 SILAS HARDY.
Witnesses as to Joel Cowee, Jr.:
 EDW. F. BROWN,
 L. W. BENDRÉ.